(12) United States Patent
Sommain

(10) Patent No.: US 9,943,858 B2
(45) Date of Patent: Apr. 17, 2018

(54) METHOD FOR TREATING WASTE, IN PARTICULAR HOUSEHOLD REFUSE, AND UNIT FOR IMPLEMENTING SAME

(71) Applicant: SUEZ ENVIRONNEMENT, Paris la Defense (FR)

(72) Inventor: Arnaud Sommain, Mireval (FR)

(73) Assignee: SUEZ ENVIRONMENT (FR)

( * ) Notice: Subject to any disclaimer, the term of this patent is extended or adjusted under 35 U.S.C. 154(b) by 139 days.

(21) Appl. No.: 14/388,731

(22) PCT Filed: Mar. 25, 2013

(86) PCT No.: PCT/IB2013/052360
§ 371 (c)(1),
(2) Date: Sep. 26, 2014

(87) PCT Pub. No.: WO2013/144818
PCT Pub. Date: Oct. 3, 2013

(65) Prior Publication Data
US 2015/0048008 A1    Feb. 19, 2015

(30) Foreign Application Priority Data

Mar. 27, 2012  (FR) ...................... 12 52708

(51) Int. Cl.
*B03B 9/06*      (2006.01)
*C05F 9/00*      (2006.01)
*C05F 17/00*    (2006.01)

(52) U.S. Cl.
CPC ............ *B03B 9/06* (2013.01); *C05F 9/00* (2013.01); *C05F 17/0027* (2013.01); *Y02E 50/343* (2013.01); *Y02P 20/145* (2015.11); *Y02W 30/43* (2015.05); *Y02W 30/47* (2015.05)

(58) Field of Classification Search
None
See application file for complete search history.

(56) References Cited

U.S. PATENT DOCUMENTS

| 4,203,376 A | 5/1980 | Hood |
| 5,957,295 A | 9/1999 | Neureither |
| 6,379,527 B1 * | 4/2002 | Vogt .................. B03B 9/06 205/560 |
| 2006/0289356 A1 | 12/2006 | Burnett et al. |

FOREIGN PATENT DOCUMENTS

| CN | 1649673 | 8/2005 |
| CN | 101065188 | 10/2007 |
| CN | 101237938 | 8/2008 |
| DE | 102007049479 | 4/2009 |
| EP | 0092164 | 10/1983 |
| FR | 2951095 | 4/2011 |

OTHER PUBLICATIONS

Fink, Biogas Systems Work on Food Residuals Streams, Biocycle International, Apr. 2007, 48, 4, pp. 60-61.*
International Search Report PCT/IB2013/052360 dated Aug. 22, 2013.
Corresponding Chinese Office Action dated Jan. 17, 2015. CN.

\* cited by examiner

*Primary Examiner* — Karen Cochrane Carlson
*Assistant Examiner* — Jennifer M. H. Tichy
(74) *Attorney, Agent, or Firm* — The Belles Group, P.C.

(57) ABSTRACT

The invention relates to a waste treatment method in which waste is subjected to a first screening process (4). The fraction of waste passing through the screening is subjected to a pre-fermentation treatment in a rotating tube (1) and the material leaving the pre-fermentation treatment tube is subjected to mixing in a mixing hopper, and, subsequently, to a methanization treatment in a digester (2). The organic materials are separated from the undesirable products in the material leaving the pre-fermentation treatment tube before it enters the digester. The digester (2) is horizontal and mechanically stirred, and a fraction of the digestate leaving the digester is recirculated at least in the mixing hopper, the recirculation rate being sufficiently high to ensure complete mixing.

15 Claims, 2 Drawing Sheets

METHOD FOR TREATING WASTE, IN PARTICULAR HOUSEHOLD REFUSE, AND UNIT FOR IMPLEMENTING SAME

PRIORITY

Priority is claimed as a national stage application, under 35 U.S.C. § 371, to international application No. PCT/IB2013/052360, filed Mar. 25, 2013, which claims priority to French application FR1252708, filed Mar. 27, 2012. The disclosures of the aforementioned priority applications are incorporated herein by reference in their entirety.

The invention relates to a process for treating waste, in particular household refuse, containing organic matter mixed with undesirable products, especially metals, mineral matter, plastics, and glass, a process of the type of those according to which:

the waste is subjected to a first sorting by screening,
the fraction of waste passing through the screening is subjected to a prefermentation treatment in a rotating tube with feed at one end and extraction at the other end,
and the material leaving the prefermentation treatment tube is subjected to mixing in a mixing hopper, then to a methanization treatment in a digester.

The household waste resulting from non-selective collections contains different categories of material such as putrescible waste (food waste, green waste), paper, cardboard, glass, plastics, ferrous and non-ferrous metals, fabrics, sanitary textiles, toxic products (batteries, pots of paint, etc).

The methanization and composting of this household waste with a view to converting it to reusable biogas and compost generally comprises four main steps:

a mechanical preparation of the waste which aims to separate the biodegradable organic matter from the other fractions that cannot be upgraded to biogas or to compost; a prefermentation rotating tube, generally that is essentially horizontal, constitutes a means for such a preparation;
methanization, which aims to produce renewable energy and is carried out in horizontal or vertical chambers, which may or may not be mechanically stirred;
composting, or aerobic maturation, which generally involves a prior operation of pressing the digestate originating from the methanization, in order to achieve a level of solids content and a porosity that enable the self-composting of the digestate, or then requires the provision of a structuring agent and the mixing thereof with the digestate in order to obtain a compostable substrate;
final refining which aims to additionally remove the contaminants remaining after the preceding two operations, and to prepare the compost to a particle size that enables the agronomical upgrading thereof.

The mechanical preparation may comprise a preliminary crushing followed by particle size sorting steps, then an anaerobic digestion of the organic substrate as taught by EP 0 131 319. Such a process has the major drawback of separating contaminants or the reusable materials (glass, plastic, fabric, etc.), which generally leads to sorting difficulties and generates a high risk of contamination of the compost and requires equipment of very large sizes with respect to the requirements.

FR 2 951 095 discloses a process for treating household waste that comprises several particle size sorting steps and which avoids the use of a prefermentation rotating tube which mixes waste that is reusable and waste that is not reusable in the form of compost.

In the case where the digestion is carried out in a horizontal digester, after the step of anaerobic digestion of the organic substrate, the digestate is dehydrated in a specific unit in order to achieve a solids content that is optimized for the post-treatment by composting. A liquid fraction is recovered and purified in order to be reused: the digestate pressing liquors.

So as not to exceed the maximum viscosity that allows circulation of the organic substrate in the feed pipes, mixing is carried out between the organic fraction prepared and the pressing liquors of the digestate. Thus, in order to introduce a volume of organic fraction to be digested, it is practically necessary to introduce the same volume of liquid. This liquid occupies a large volume in the digester without providing a significant contribution to the production of methane. This dilution reduces the treatment capacity and leads to a lower content of solids in the liquor.

The objective of the invention is above all to obtain an optimal biogas production with respect to the sizing of the digester used. The invention also aims to produce a digestate containing a high solids content in order to be able to render optional the pressing thereof before aerobic maturation, without adversely affecting the digestate, and to provide a compost that conforms to the standards applied in the countries concerned by the process.

According to the invention, the process for treating waste, in particular household refuse, containing organic matter mixed with undesirable products, especially metals, mineral matter, plastics, and glass, according to which process:

the waste is subjected to a first sorting by screening,
the fraction of waste passing through the screening is subjected to a prefermentation treatment in a rotating tube with feed at one end and extraction at the other end,
and the material leaving the prefermentation treatment tube is subjected to mixing in a mixing hopper, then to a methanization treatment in a digester, is characterized in that:
the organic matter is separated from the undesirable products in the material leaving the prefermentation treatment tube before it enters the digester,
the digester is horizontal, mechanically stirred, and a fraction of the digestate leaving the digester is recirculated at least to the mixing hopper, the recirculation ratio being high enough to ensure complete mixing.

Preferably, the recirculation ratio of the digestate is at least 200%. The solids content of the digestate is at least 30%.

The mixing in the mixing hopper may be carried out without incorporation of pressing liquor or industrial water.

The mixing in the mixing hopper may also be carried out with incorporation of pressing liquor or industrial water; in the latter case the volume of pressing liquor or industrial water incorporated is less than that incorporated in the absence of recirculation of digestate into the mixing hopper.

The invention has overcome the prejudice according to which the digestate constituted a product with a viscosity that was too high for satisfactory recirculation to be obtained, with a homogeneous product, in a horizontal digester. The invention has made it possible to exploit a wetting power of the digestate which, unexpectedly, is greater than that of the pressing liquors. The digestate no longer needs to be subjected to a pressing operation on leaving the digester.

The invention has modified the recipe of the mixture undergoing digestion by substituting all or part of the pressing liquors or industrial water with digestate.

At identical viscosity, the solids content resulting from the new recipe is higher, the wetting power of the digestate being greater than that of the pressing liquors. It is thus possible to significantly increase the organic loading in the mixture while reducing the overall volume introduced.

The invention optimizes the methanization step in a horizontal digester, making it possible in particular to increase the treatment capacity and to render optional the step of mechanical dehydration of the digestate before the composting post-treatment while obtaining a standard compost under the same conditions. Preferably, the invention uses a succession of steps that make it possible to extract the undesirable products as much as possible from the crude product, to maximize the production of a clean organic substrate of homogeneous composition and having a constant particle size profile.

The digestate has a satisfactory solids content for enabling the composting post-treatment; the dryness remains lower than that obtained after a step of mechanical dehydration but very greatly simplifies the exploitation and improves the yields. Good management of the viscosity of the liquor in the digester makes it possible to satisfy the mechanical stirring conditions without excessive stresses.

The recirculated digestate fraction may be introduced, for one portion, at the inlet of the digester, downstream of the mixing hopper.

The recirculated digestate fraction may be introduced, for a portion of greater than 50% by weight, into the mixing hopper, and for the other portion at the inlet of the digester, downstream of the mixing hopper.

Advantageously, the waste as collected, and without prior crushing, is subjected to the first sorting by screening through screens having a mesh size L1;

the fraction of waste that has passed through this first sorting operation, which comprises elements of which the large size is less than the value L1, is sent to the prefermentation treatment in the rotating tube;

the rotating tube is fed with waste regularly over time, by smoothing out the fits and starts of collection;

the residence time of the waste in the rotating tube is substantially constant and at least equal to the time needed so that almost all of the organic matter is in a particle size fraction smaller than that of the undesirable products;

and the waste, after leaving the rotating tube and before entering the digester, is subjected to a screening through screens having a mesh size L2 that ensures a separation between the organic matter of finer particle size and the undesirable products.

The residence time of the waste in the rotating tube may be at least equal to the time needed so that at least 75% by weight of the organic matter leaving the prefermentation tube is in a particle size fraction smaller than that of the undesirable products.

Preferably, the feeding of the rotating tube with waste and the extraction of the treated waste are carried out continuously, the extraction flow rate corresponding to the feed flow rate, less the loss of matter and loss by evaporation, and being substantially constant over a duration of several hours, preferably of at least 10 h and advantageously of 24 h.

The residence time of the waste in the rotating tube may be between two and four days, preferably between two and a half days and three and a half days and advantageously three days.

The size L1 of the mesh of the first sorting operation may be between 200 and 600 mm, preferably between 350 and 500 mm and advantageously equal to 450 mm.

The size L2 of the mesh of the screen before entry into the digester may be between 5 and 14 mm, preferably between 7 and 12 mm and advantageously equal to 8 mm.

The feeding of the rotating tube may use at least one metering hopper suitable for smoothing out the possible fits and starts of feeding that originate from sudden variations in particle size and/or density of the collected waste stream.

Several sorting stages with smaller mesh sizes at each next stage may be provided between the outlet from the rotating tube and the last screening through screens having a mesh size L2.

The last screening before the digester may be provided by a flip-flow screen.

Downstream of the rotating tube and upstream of the last screening, the waste may be subjected to a bounce/adherence sorting.

The invention also relates to a waste treatment plant for carrying out a process as defined previously, comprising:
   a first station for sorting by screening,
   a rotating tube for the prefermentation treatment of the fraction of waste that has passed through this first sorting operation,
   and a digester in order to subject the material leaving the prefermentation treatment tube to a methanization treatment,
characterized in that:
   it comprises screening means in order to separate the organic matter and the undesirable products in the material leaving the prefermentation treatment tube before it enters the digester,
   the digester is horizontal, mechanically stirred, and a fraction of the digestate leaving the digester is recirculated at least to the mixing hopper.

The plant advantageously comprises pumping means of the concrete pump type in order to ensure the recirculation of a fraction of the outgoing digestate, the solids content of which may be greater than 30%.

Preferably, the plant is characterized in that:
   the first station for sorting by screening has a mesh size L1 for the waste as collected, and without prior crushing;
   means for feeding the rotating tube with waste are provided in order to ensure regular feeding, without interruption over time, by smoothing out the fits and starts of collection;
   the rotating tube is provided so that the residence time of the waste is at least equal to the time needed so that almost all of the organic matter is in a particle size fraction smaller than that of the undesirable products;
   and, upstream of the digester, a station for screening through screens having a mesh size L2 is provided in order to ensure a separation between the organic matter of finer particle size and the undesirable products.

The means of feeding the rotating tube may comprise at least one metering hopper suitable for smoothing out the possible fits and starts of feeding originating from sudden variations in particle size and/or density of the collected waste stream.

The plant may comprise a flip-flow screen providing the last screening before the digester.

The plant advantageously comprises several rotating tubes operating in parallel, in particular three rotating tubes.

The size L1 of the mesh of the screen of the first sorting operation may be between 200 and 600 mm, preferably between 350 and 500 mm and advantageously equal to 450 mm.

The size L2 of the mesh of the screen before entry into the digester may be between 5 and 14 mm, preferably between 7 and 12 mm and advantageously equal to 8 mm.

The means of feeding the rotating tube may comprise at least one metering hopper suitable for smoothing out the possible fits and starts of feeding originating from sudden variations in particle size and/or density of the collected waste stream.

Several sorting stages, with smaller mesh sizes at each following stage, may be provided between the outlet of the rotating tube and the last screening by a screen having a mesh size L2.

The invention consists, apart from the provisions set out above, of a certain number of other provisions, that will be mentioned more explicitly below regarding an exemplary embodiment described with reference to the appended drawings, but which is in no way limiting. In these drawings.

One objective of the invention is to obtain:
a quality of organic fraction that is homogeneous, after passing into a prefermentation treatment rotating tube 1 (FIG. 1) and as free as possible of undesirable products after screening,
and an optimal biogas production with respect to the sizing of the digester 2 used.

The invention also aims to provide a digestate with a high solids content, so as to be able to render optional the pressing thereof before aerobic maturation without adversely affecting this digestate, and a compost that conforms to the standards applied in the countries affected by the process.

The term "digestate" denotes the product leaving the digester, consisting of organic matter after anaerobic digestion.

It turned out that the quality level of the material leaving the prefermentation rotating tube was not constant. It was able to be established that the irregular supply of material over time, especially only five days out of seven, and eight to twelve hours per day, led to a variable residence time of the material in the rotating tube and prevented the desired quality level from being achieved.

The screening mesh at the outlet of the tube 1 is a constant; if the organic matter is not sufficiently reduced, it will be removed and will result in a significant loss for the methanization. A contrario, if the physical impurities, constituting the undesirable products, pass through this mesh, these impurities will be found in the substrate introduced into the digester, which is to be avoided.

According to the present description, the size of a screen mesh corresponds, for a square or rectangular mesh, to the length of the diagonal of the mesh, and for a circular mesh, to the diameter of this mesh.

Figure 2:
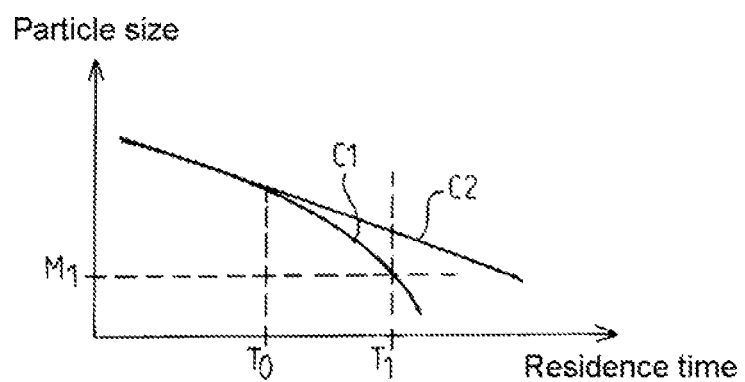
FIG. 2 is a graph that schematically illustrates the change in the particle size of the organic matter and of the inorganic or synthetic organic matter of the same sizes in a prefermentation treatment rotating tube, as a function of the residence time shown on the x-axis, while the mean diameter of the particle size is shown on the y-axis.

It has been able to be established that the particle size of the organic matter and of the undesirable products changed differently as a function of the residence time in the rotating tube. In FIG. 2 the variation of the particle size shown on the y-axis, in the form of a mesh size through which the product leaving the tube 1 may pass, as a function of the residence time of the product in the tube 1, shown on the x-axis, is illustrated schematically.

C1 corresponds to the particle size curve of the organic matter, while C2 corresponds to the particle size curve of the undesirable mineral, inorganic or synthetic organic matter. Beyond a residence time $T_0$, the curve C1 breaks away downward with respect to the curve C2. After a residence time $T_1$, the particle size of the organic matter (curve C1) is substantially smaller than that of the inorganic or synthetic organic matter. By choosing a screen for which the mesh has a size M1 corresponding to the particle size of the curve C1, or which is slightly greater, in particular by 1 mm, than this particle size, an effective separation between the organic matter of the undesirable products is ensured, with a minimal loss of organic matter.

By way of non-limiting example, T1 may be between 2 and 3.5 days, and M1 may be between 7 and 9 mm, advantageously equal to 8 mm.

Figure 1:
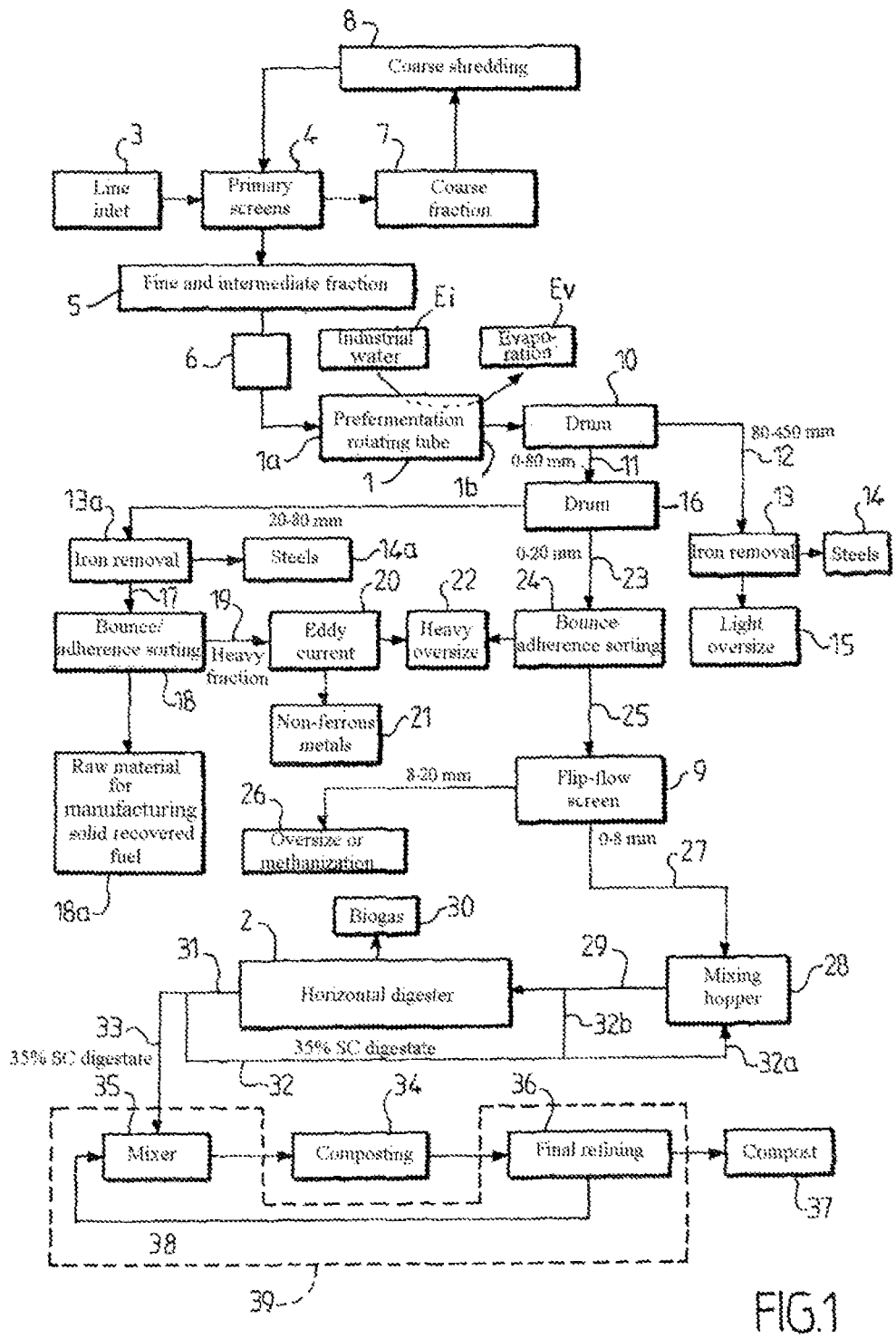
FIG. 1 is a diagram of a treatment process according to the invention.

FIG. 1 of the drawings illustrates a diagram of the whole of a treatment line implementing the process of the invention.

The waste collected, especially by dump trucks, is introduced into a treatment line inlet 3 and is sent to one or more primary screens 4, especially using belt conveyors or metal apron conveyors. Each screen 4 consists of a screen in which the meshes have a size L1 provided in order to retain the coarse fractions, the large size of which is greater than L1. The size L1 is advantageously between 400 and 500 mm, preferably equal to 450 mm. The fraction 5 that passes through the screens 4 constitutes a fine and intermediate fraction which is used to feed the essentially horizontal rotating tube 1.

The same amounts of waste are introduced, at constant flow rate, into the tube 1 and extracted continuously, quasi-permanently. The feeding of the tube 1 is optimized by use of hoppers 6, in particular metering hoppers (dosing hopper, the bottom of which is equipped with sequentially moving slats (or equivalent) allowing the product to advance), which make it possible to smooth out the possible fits and starts of feeding that originate from sudden variations in particle size and/or density of the waste stream. According to the diagram, the smoothing hopper 6 is installed downstream of the outlet of the fraction 5 and upstream of the tube 1. As a variant, the smoothing hopper 6 could be located between the line inlet 3 and the primary screens 4. In the latter case, the equipment does not fulfill the action of limiting the fits and starts as well (the break of load permitted by the hopper upstream of the tubes, according to the diagram of FIG. 1, allows maintenance actions, a discontinuous treatment of the waste).

The coarsest fraction 7 having a size greater than that of the meshes of the screens 4, for example greater than 450 mm, and which has not passed through the screens, may be subjected to a coarse shredding 8 before being reintroduced into the prefermentation tubes 1 or as a variant into the primary screens 4, or being treated separately.

Industrial water Ei is introduced into the prefermentation tubes 1 in order to promote biological activity. The temperature rise of the biological reactions causes the evaporation Ev of all or some of this industrial water.

The rotating tube 1 is horizontal and has a closed cylindrical wall, the inner surface of which is equipped with profiles, for example U-shaped profiles that turn their concavity radially inward, which are regularly spaced apart, extending along the generatrices of the cylinder, and are suitable for rotating the waste introduced at the end 1a. The waste progresses through the tube 1 under the effect of the thrust of the material loaded at the inlet 1a and is extracted at the outlet 1b after a residence time T in the tube 1.

By ensuring a suitable residence time T of the waste in the rotating tube 1 (T is equal to or greater than T1), combined with regular feeding, a mixture is obtained at the outlet 1b in which the organic matter has a particle size equal to or less than M1, in particular less than 8 mm, while the undesirable products have a larger particle size. Separation of the organic matter to be introduced at the inlet 2a of the digester 2, relative to the undesirable products, is provided by a screen 9 having meshes whose size corresponds to that of the particle size of the organic matter, in particular 8 mm. The screen 9 is advantageously a flip-flow screen; such a screen is provided in order to carry out screening through a successively taut and slackened elastic cloth, offering a slight deformation of the meshes which are unclogged, this system allowing screening of wet product in very small particle sizes.

Several prefermentation rotating tubes 1 may be provided in order to operate in parallel, especially three prefermentation tubes. The regularity of the feed and the extraction from the tubes makes it possible to establish a finished product of homogeneous composition and constant particle size profile at the fraction 27 to be introduced into the digester 2. The amount of undesirable products (plastics, glass, pebbles, metals) is practically zero in the fraction having a particle size of less than M1.

In order to avoid overloading the screen 9 with undesirable products, the sizes of which are substantially greater than the mesh of the screen 9, several sorting stages are provided upstream of the screen 9.

A first sorting stage at the outlet 1b of the tube 1 is carried out by a drum screen 10, or perforated drum, which allows a fraction 11, for example of particle size 0-80 mm, to pass through and rejects an oversize 12 corresponding for example to a particle size 80-450 mm. This oversize 12 is subjected to an iron-removal step 13 that makes it possible to separate the steels 14 from the light oversize 15 having high net calorific value NCV.

The fraction 11 which has passed through the screen 10 is introduced into a second drum screen 16 having meshes with a size smaller than that of the screen 10, in particular 20 mm meshes. The oversize from the screen 16, which corresponds in the example considered to a particle size of 20-80 mm, is subjected to an iron-removal step 13a which separates the steels 14a from another fraction 17. This fraction 17 is subjected to a bounce/adherence sorting step 18. This sorting operation consists in projecting the material onto a rigid plate or an inclined belt conveyor, which causes heavy oversize to bounce and lighter portions, especially organic matter, to adhere. The heavy fraction 19 resulting from the sorting 18 is subjected to a eddy current separation 20 which makes it possible to separate the non-ferrous metals 21 from the heavy oversize 22. The lightest fraction 18a resulting from the bounce/adherence sorting step 18 constitutes the raw material for the manufacture of solid recovered fuel.

The fraction 23 which has passed through the meshes of the screen 16, for example the fraction of particle size 0-20 mm, is subjected to a sorting 24, preferably of bounce/adherence type, which separates heavy oversize 22 from a lighter fraction 25 containing organic matter.

This fraction 25 is then subjected to a separation by the screen 9 having meshes with a size equal to or less than M1 corresponding to the separation between the particle size of the organic matter and that of the undesirable products according to FIG. 2, after a residence time at least equal to T1 in the rotating drum 1. The screen 9 separates an oversize 26, the particle size of which is, for example, 8-20 mm, and a fine fraction 27, the particle size of which is, for example, 0-8 mm. The screen 9 is advantageously a flip-flow screen.

The fine fraction 27, leaving the screen 9, is introduced into a mixing hopper 28 that gives, at the outlet 29, a homogeneous mixture which is introduced at the inlet of the mechanically stirred horizontal digester 2. The digester 2 consists of a cylindrical tube of horizontal axis in which means of stirring the material introduced are arranged. The stirring means may comprise a coaxial rotating shaft equipped with spaced out radial arms, provided with mixing paddles. The digester 2 produces the biogas recovered at an outlet 30 located in the upper part of the digester. The digestate is discharged through an outlet 31 opposite the digester inlet. A fraction 32 of the digestate is recirculated according to a portion 32a into the mixing hopper 28 and, according to another portion 32b, to the inlet of the digester 2, downstream of the hopper 28.

The digestate has a solids content of at least 30% by weight, and the fraction 32 is recirculated using pumping means (not represented) of concrete pump type, that can move high-viscosity products.

The digestate serves as a carrier for transporting the organic substrate constituted by the fraction 27. The solids content of the mixture is controllable as the incorporation of liquid (mains water, industrial waters, etc.) is also possible, and the mixture produced in the hopper 28 is an intimate and homogeneous mixture.

The mixing in the mixing hopper 28 may be carried out without incorporation of pressing liquor or industrial water.

The mixing in the mixing hopper 28 may also be carried out with incorporation of pressing liquor or industrial water; in the latter case the volume of pressing liquor or industrial water incorporated is less than that which would be incorporated in the absence of recirculation of digestate into the mixing hopper.

The recirculation ratio R/Q of the digestate is preferably greater than 200% so as to ensure an infinitely mixed material. The recirculation ratio R/Q corresponds to the ratio of the mass flow R of the recirculated digestate fraction 32 to the flow Q of the fraction 27 of material introduced into the hopper 28.

The fraction 32a recirculated into the hopper 28 is preferably greater than the fraction 32b recirculated to the inlet of the digester, downstream of the hopper 28. The fraction 32a is advantageously at least equal to 60% by weight of the recirculated fraction 32.

By way of a non-limiting numerical example, the hopper 28 may have a volume of 2 $m^3$; the fraction 27 introduced into the hopper 28 may be 1200 t/month, the fraction 32a 1800 t/month and the fraction 32b 1740 t/month. The total fraction 32 recirculated is 3540 t/month.

According to this example, the recirculation ratio is 3540/1200, i.e. around 300%.

According to the invention, the composition, or recipe, of the mixture introduced into the digester 2 is improved by the recirculation of the digestate which replaces a mixing fluid such as industrial water. The wetting power of the digestate is greater than that of the liquid. It is thus possible to significantly increase the organic load in the mixture while reducing the overall volume.

The recirculation of the digestate into the mixing hopper 28 increases the treatment capacity of the digester by at least 30%. Indeed, the volume needed to introduce one ton of organic substrate, originating from the fraction 27, is considerably reduced. By way of non-limiting example, the capacity of introducing organic substrate has changed from around 25 t/day to 40 t/day according to the invention.

At identical viscosity, the solids content of the mixture 29 resulting from the new composition is higher. It is thus possible to significantly increase the organic load in the mixture while reducing the reduced overall volume.

The digestate has a solids content of around 35% which may range up to 40%, and which is satisfactory for allowing post-treatment by composting; this dryness very greatly simplifies the exploitation and improves the yields. Good management of the viscosity of the liquor entering into the digester makes it possible to satisfy the mechanical mixing conditions in the digester, without excessive stresses.

The fraction 33 of the digestate, which is not recirculated, is used for the composting step 34. For this, the fraction 33 is introduced into a mixer 35, the output of which is sent to the composting stage 34. The material leaving the composting stage 34 is sent to a final refining step 36 which provides, at the outlet, the compost 37. A fraction 33 of the refining step is advantageously recirculated to the inlet of the mixer 35.

The mixer 35 and the refining step 36 constitute a structuring treatment 39 for the compost, shown schematically by a dotted-line outline. This treatment could be replaced by a dehydration step, at the outlet of the composting step 34. The fraction 33 would then be directly introduced at the inlet of the composting stage 34.

The invention makes it possible to obtain a quality of organic fraction 29, sent to the digester, which is homogeneous and free as far as possible from undesirable products, which is highly favorable to the stability of the methanization.

The small particle size of the organic fraction, 0-8 mm, increases the contact area between the bacteria and the substrate, which is also favorable to the methanization. The reduced content of undesirable products and the constant homogeneity of the product make it possible to guarantee the conformity of all the production batches of compost. This small particle size is optimally exploited in the horizontal digester 2, the mechanical stirring of which enables the degassing of the biogas produced in the liquor.

The production of biogas by the digester 2 is optimal with regard to the sizing of the digester used and makes it possible to obtain a digestate having a high solids content (SC), of at least 30% SC up to 38% SC, which makes it possible to render optional a mechanical pressing before aerobic maturation, without adversely affecting the digestate, and to obtain a compost that conforms to the standards.

Owing to the mechanical-biological separation process involving the rotating tube 1, the steps for treating the product at the inlet and outlet of the tube by screening make it possible to optimize the quality of each of the categories of materials contained in the waste with respect to its upgrading route:
- the most unstable, highly reactive organic matter is composted rapidly in the tube 1;
- the organic substrate (fraction 27) intended for the methanization is optimized;
- the separation of the ferrous and non-ferrous metals of great cleanliness is optimal;
- the streams having a high calorific value are well separated;
- the cleanliness of the final compost is ensured.

The improvement in the stability of the digester 2 obtained according to the invention has an impact on the electricity production output per ton of organic substrate introduced into the digester. According to one example, the mean output has experienced an increase of around 10.

The process of the invention can be used industrially for sizing a waste treatment unit with methanization, by maximizing both:
- the degree of extraction of the non-synthetic organic matter initially present in the waste, owing to a continuous feeding of the rotating tube 1 and an optimal residence time in this tube, while improving the cleanliness thereof;
- the production of biogas from the methanization process using a horizontal digester and driving it in a mode similar to an infinitely mixed mode, due to the recirculation ratio, instead of the customary plug flow mode, and maintaining the liquor present in the digester at an optimal solids content in the vicinity of 35%.

The substitution of the pressing liquors by the digestate has increased the treatment capacity of the digesters by at least 30%, indeed, the volume needed to introduce one ton of organic substrate has been considerably reduced. The improvement of the solids content The solids content of the digestate has been increased in order to change from around 19.4% to around 33.5%.

The invention claimed is:

1. A process for treating waste containing organic matter mixed with undesirable products, the process comprising:
    the waste is subjected to a first sorting by screening,
    a fraction of the waste passing through the screening is subjected to a prefermentation treatment in a rotating tube with a feed end and an extraction end,
    and material leaving the rotating tube is subjected to mixing in a mixing hopper, then to a methanization treatment in a digester,
    wherein:
        the organic matter is separated from the undesirable products in the material leaving the rotating tube before entering the mixing hopper,
        the digester is horizontal, mechanically stirred, and a fraction of digestate leaving the digester is recirculated directly after leaving the digester at least to the mixing hopper, a recirculation ratio being high enough to ensure complete mixing, wherein the recirculated digestate enters the mixing hopper with a solid particle content of between 30% to 40%.

2. The process as claimed in claim 1, wherein the recirculation ratio of the digestate is at least 200%.

3. The process as claimed in claim 1, wherein a solids content of the digestate is at least 30%.

4. The process as claimed in claim 1, wherein the mixing in the mixing hopper is carried out without incorporation of pressing liquor or industrial water.

5. The process as claimed in claim 1, wherein the mixing in the mixing hopper is carried out with incorporation of pressing liquor or industrial water.

6. The process as claimed in claim 1, wherein at least a portion of the fraction of the digestate that is recirculated is introduced at an inlet of the digester, downstream of the mixing hopper.

7. The process as claimed in claim 1, wherein a first portion of the fraction of the digestate that is recirculated is introduced into the mixing hopper, the first portion being greater than 50% by weight, and a second portion of the fraction of the digestate that is recirculated is introduced at an inlet of the digester, downstream of the mixing hopper.

8. The process as claimed in claim 1, wherein:
the waste as collected, and without prior crushing, is subjected to the first sorting by screening through screens having a mesh size L1;
a fraction of the waste that has passed through the first sorting, which comprises elements which are sized less than the mesh size L1, is sent to the prefermentation treatment in the rotating tube;
the rotating tube is fed with waste regularly over time;
a residence time of the waste in the rotating tube is at least equal to a time needed so that almost all of the organic matter is in a particle size fraction smaller than that of the undesirable products;
and the waste, after leaving the rotating tube and before entering the digester, is subjected to a screening through screens having a mesh size L2, which is sized to separate the organic matter from the undesirable products.

9. The process as claimed in claim 8, wherein the residence time of the waste in the rotating tube is at least equal to the time needed so that at least 75% by weight of the organic matter leaving the rotating tube is in a particle size fraction smaller than that of the undesirable products.

10. The process as claimed in claim 8, wherein a feed flow rate of the waste flowing into the feed end and an extraction flow rate of the waste flowing from the extraction end of the rotating tube is continuous, with the extraction flow rate corresponding to the feed flow rate, less a loss of matter and loss by evaporation, and the feed flow rate and the extraction flow rate being constant over a duration of several hours.

11. The process as claimed in claim 1, wherein a residence time of the waste in the rotating tube is between two and four days.

12. The process as claimed in claim 10, wherein the duration of several hours is at least 10 hours.

13. The process as claimed in claim 12, wherein the duration of several hours is 24 hours.

14. The process as claimed in claim 11, wherein the residence time is between two and a half days and three and a half days.

15. The process as claimed in claim 14, wherein the residence time is three days.

\* \* \* \* \*